US009811960B2

(12) United States Patent
Voss

(10) Patent No.: US 9,811,960 B2
(45) Date of Patent: Nov. 7, 2017

(54) METHOD AND SYSTEM FOR THE CONFIGURATION OF SMALL LOCKING SYSTEMS

(71) Applicant: SimonsVoss Technologies GmbH, Unterfohring (DE)

(72) Inventor: Ludger Voss, Munich (DE)

(73) Assignee: SIMONSVOSS TECHNOLOGIES GMBH, Unterfohring (DE)

( * ) Notice: Subject to any disclaimer, the term of this patent is extended or adjusted under 35 U.S.C. 154(b) by 0 days.

(21) Appl. No.: 14/429,898

(22) PCT Filed: Sep. 20, 2013

(86) PCT No.: PCT/EP2013/069645
§ 371 (c)(1),
(2) Date: Mar. 20, 2015

(87) PCT Pub. No.: WO2014/044832
PCT Pub. Date: Mar. 27, 2014

(65) Prior Publication Data

US 2015/0235497 A1 Aug. 20, 2015

(30) Foreign Application Priority Data

Sep. 21, 2012 (EP) .................................... 12185551

(51) Int. Cl.
*G05B 19/00* (2006.01)
*G07C 9/00* (2006.01)

(52) U.S. Cl.
CPC .................... *G07C 9/00309* (2013.01); *G07C 2009/00769* (2013.01); *G07C 2009/00865* (2013.01)

(58) Field of Classification Search
None
See application file for complete search history.

(56) References Cited

U.S. PATENT DOCUMENTS

| | | | | |
|---|---|---|---|---|
| 2007/0290798 | A1 | 12/2007 | Larson et al. | |
| 2010/0073129 | A1 | 3/2010 | Pukari | |
| 2010/0306549 | A1 | 12/2010 | Ullmann | |
| 2011/0285528 | A1 | 11/2011 | Weinstein et al. | |
| 2012/0213362 | A1* | 8/2012 | Bliding .............. | G07C 9/00309 380/44 |
| 2012/0222103 | A1 | 8/2012 | Bliding et al. | |

OTHER PUBLICATIONS

Notification of Transmittal of International Preliminary Report on Patentability for PCT Application No. PCT/EP2013/069645, dated Mar. 24, 2015, 18 pages.
International Search Report for PCT Application No. PCT/EP2013/069645, dated Nov. 26, 2013, 3 pages.

* cited by examiner

*Primary Examiner* — Adolf Dsouza
(74) *Attorney, Agent, or Firm* — Westman, Champlin & Koehler, P.A.

(57) ABSTRACT

The present invention relates to a method and a system for the configuration of small locking systems with electronic locks, preferably electronic locking cylinders, which can preferably communicate with passive RFID cards. The present invention particularly relates to a method and a system which not only allows the easy configuration of locks/locking cylinders, but also of corresponding RFID cards, preferably by using a smartphone.

9 Claims, 4 Drawing Sheets

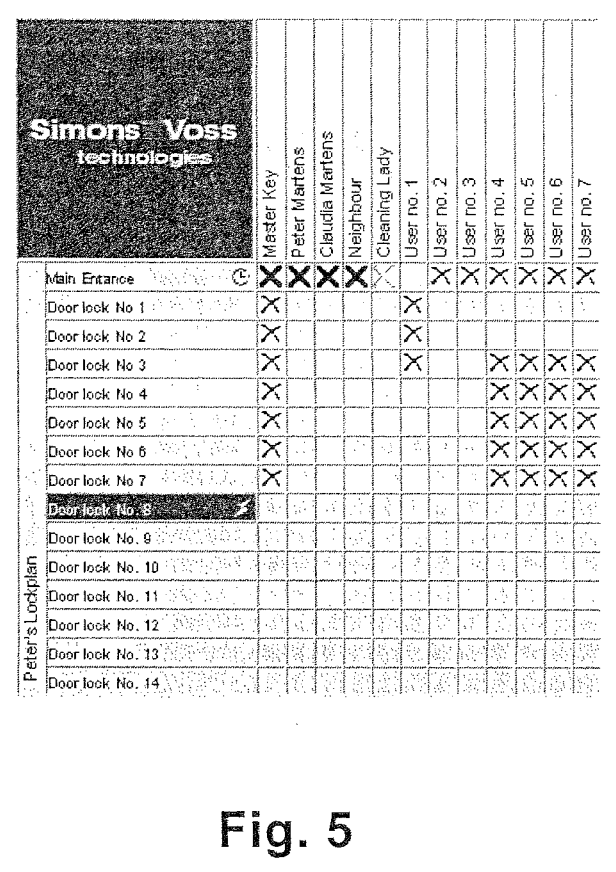

Simons Voss technologies

Peter's Lockplan

| | Master Key | Peter Martens | Claudia Martens | Neighbour | Cleaning Lady | User no. 1 | User no. 2 | User no. 3 | User no. 4 | User no. 5 | User no. 6 | User no. 7 |
|---|---|---|---|---|---|---|---|---|---|---|---|---|
| Main Entance | X | X | X | X | X | | X | X | X | X | X | X |
| Door lock No 1 | X | | | | | X | | | | | | |
| Door lock No 2 | X | | | | | X | | | | | | |
| Door lock No 3 | X | | | | | X | | | X | X | X | X |
| Door lock No 4 | X | | | | | | | | X | X | X | X |
| Door lock No 5 | X | | | | | | | | X | X | X | X |
| Door lock No 6 | X | | | | | | | | X | X | X | X |
| Door lock No 7 | X | | | | | | | | X | X | X | X |
| Door lock No. 8 | | | | | | | | | | | | |
| Door lock No. 9 | | | | | | | | | | | | |
| Door lock No. 10 | | | | | | | | | | | | |
| Door lock No. 11 | | | | | | | | | | | | |
| Door lock No. 12 | | | | | | | | | | | | |
| Door lock No. 13 | | | | | | | | | | | | |
| Door lock No. 14 | | | | | | | | | | | | |

Fig. 5

METHOD AND SYSTEM FOR THE CONFIGURATION OF SMALL LOCKING SYSTEMS

CROSS-REFERENCE TO RELATED APPLICATION

This Application is a Section 371 National Stage Application of International Application No. PCT/EP2013/069645, filed 20 Sep. 2013 and published as WO 2014/044832 A1 on 27 Mar. 2014, in German, the contents of which are hereby incorporated by reference in their entirety.

The invention relates to a method and a system for the configuration of small locking systems with electronic locks, preferably electronic locking cylinders, which can preferably communicate with passive RFID cards. The present invention particularly relates to a method and a system which not only allows the easy configuration of locks/locking cylinders, but also of corresponding electronic identification media for unlocking the locks/locking cylinders, preferably by using a smartphone.

BACKGROUND OF THE INVENTION

Electronic locking systems are advantageous vis-à-vis mechanical locking systems in that each lock or each key having access authorisation, for example as transponder or as RFID card, may individually be configured. However, in order to prevent manipulations, a complex system for the allocation and administration of access authorisations, as well as for generating key data is necessary, consisting of data base servers and user interface clients as well as a programming infrastructure with programming devices and/or network infrastructure. It has to be ensured that corresponding computer systems are safely established and are provided with appropriate software. Since the costs for said infrastructure cannot be disregarded, electronic locking systems are typically used only when a certain number of locking cylinders/locks/fittings (in the following referred to as locking) is needed. An average locking system comprises approximately 100 cylinders/fittings and approximately 250 locking media (transponders). Such systems efficiently support middle-scale systems and large systems. In contrast thereto, small locking systems of typically below 100, for example approximately 10 lockings are rarely provided with the technically advantageous electronic lockings. The reasons for that are inter alia relatively high investments in programming environments (hardware and software), but also the relatively high training effort for a software which is actually intended for larger applications. Moreover, the effort for smaller locking systems, for example for smaller offices having less locks and less persons which have access authorisation, is considered as deterrent. Thus, it is the object of the present invention to provide a simplified method or system with which electronic small locking systems may be configured preferably fast, reliably and user-friendly.

SUMMARY OF THE INVENTION

Said object is achieved by the method of independent claim 1. Further preferred embodiments of the invention are claimed in the dependent claims.

In particular, the present invention provides a complete solution for smaller locking systems, preferably making a complex installation of corresponding software in the company superfluous. According to the invention, the locking system, which preferably comprises electronic locks and RFID cards for operating said locks, may be configured via a smartphone.

Usually a mobile phone is referred to as smartphone if it provides better computer functionality and connectivity than a common advanced mobile phone. Up-to-date smartphones usually may be individually upgraded with new functions by the user via additional programmes (so-called “apps”). A smartphone may also be understood as a small transportable computer (PDA or tablet computer), preferably a small transportable computer having the additional function of a mobile phone. According to the invention, a smartphone having corresponding software (an app) is the link between the locks and the complex system of administering and generating corresponding data sets for operation of the locks. Separate system components which may be part of the system/method according to the invention, are described in more detail in the following.

Admin-App on the Mobile Phone of the Administrator

Preferably, all configuration tasks for a locking system or small locking system according to the invention (in the following also referred to as SOHO locking system; SmallOfficeHomeOffice-locking system) may be performed by an administrator via an “admin-app”, which is preferably operable on a smartphone and/or a small transportable computer. At least one of the following tasks may for example be part of the administrative tasks according to the invention:

(i) Registration and establishment of a new locking system, preferably including generating admin-accounts on a SOHO-cloud-server and a OTA-key server (OverTheAir-key server).

(ii) Inventory of a locking system thereby registering and/or administering the lockings related thereto (for example locks/locking cylinders/fittings) and identification media (electronic keys; for example RFID cards, smartphones, transponders).

(iii) Visualizing the locking system as locking-identification-media-matrix which is preferably scrollable via “touch-and-drag” and optionally raisable, wherein said matrix is preferably generated within the framework of an inventory process and/or by manually adding lockings or identification media which are not yet inventarized.

(iv) Handling and visualizing programming target/actual states, wherein one may preferably refer to a cloud service when detecting programming requirements.

(v) Allocating access authorisations, preferably via tipping on authorisation fields in the locking-identification-media-matrix.

(vi) Allocating identification media having specific time limits (for example: valid from . . . to . . . ; valid on . . . ), preferably after tipping on identification media in the locking-identification-media-matrix.

(vii) Storing locking system data, which have been generated according to the above, in the cloud (SOHO cloud server and/or OTA MobileKey Server).

(viii) Downloading locking system data for the visualization of the matrix and programming protocols for the programming of locks and optionally also of non-OTA-capable identification media (for example key cards).

(ix) Programming locks and/or identification media via programming protocols, for example via a wireless interface (for example NFC interface, bluetooth interface) or wired interface.

According to the invention, sensitive data of the locking system are stored outside of the smartphone and preferably also outside of the company which wishes to use the locking system. This is for example achieved in that said data are centrally stored, preferably centrally on means which have been generated only for said purpose and which have been provided by the provider/producer of the locking system. Said central means may here be referred to as cloud (100). Part of said cloud provides a so-called SOHO-cloud-LSM-service which will be explained in more detail further below. Preferably, the admin-app accesses said SOHO-cloud-LSM-service in order to store the locking system data centrally "in the cloud" and to request key and programming data.

Key data may be distributed for example via a key server, preferably a mobile key server which may distribute key data to mobile phones/smartphones. The distribution of key data to mobile phones/smartphones is preferably effected wirelessly so that a corresponding mobile key server is also referred to as OTA mobile key server. According to a preferred embodiment, the admin-app may directly access the (OTA) mobile key server. Alternatively or additionally, the (OTA) mobile key server may also be accessed via the cloud.

SOHO-Cloud-LSM-Service

Preferably a "SOHO-cloud-LSM-service", which is preferably part of the cloud, is a central service of the SOHO infrastructure. Here, the user data and/or user profiles (admin access data, authorisation matrix etc) of the user are stored and/or administered here. The preferred central storage of the data "in the cloud" enables the comfortable administration of a SOHO locking system via different devices. Data which are relevant for safety, as for example the password for the locking system, are preferably not stored in the cloud. This is, however, also possible. The SOHO-cloud-LSM-service is preferably accessed via the admin-app and communicates with a dataset service (cf. for example FIG. 1). The calculation of programming requirements as well as key datasets and programming protocols may be provided by the dataset service.

Dataset Service

The dataset service according to the invention is a service which is preferably used by the SOHO-cloud-LSM-server, which may generate key and/or programming datasets for the lockings (for example locks/locking cylinders) of the locking system. The generated datasets preferably return from the dataset service to the SOHO-cloud-LSM-service and may then be delivered therefrom to the admin-app on the administrator's smartphone (programming of the lock, generation of common key cards) and/or may be stored on the mobile key server described above, preferably on the OTA mobile key server. Preferably, the dataset service is accessed directly via the SOHO-cloud-LSM service.

(OTA) Mobile Key Server

A mobile key server according to the invention preferably serves for the distribution of key data to appropriate media. i.e. mobile phones which may serve as keys, transponders which may serve as electronic keys or RFID cards which may serve as electronic keys. Preferably, the distribution of key data via the mobile key server is effected wirelessly, i.e. OverTheAir (OTA). In the following, this is also referred to as OTA distribution of keys or OTA issuance of keys. The OTA mobile key server is preferably accessed via the admin-app for the issuance/distribution of key data. For example, key data may be stored on the OTA mobile key server via the admin-app. Additionally or alternatively, key data may also be stored on the OTA mobile key server via the SOHO-cloud-LSM-service.

Locking

The locking system according to the invention may administrate a plurality of different electronic-mechanical locking mechanisms (lockings), for example specific electronic locks, electronic locking cylinders, electronic fittings etc. Since the essence of the invention is not the kind of the electronic-mechanical locking mechanisms used, the generally used term locking should include all of these locking mechanisms.

The preferably wireless communication with the locking is preferably carried out via an APDU-based protocol. APDU (Application Protocol Data Unit) typically refers to a communication unit between a chip card and a chip card application according to the ISO standard 7816. APDU is typically a communication unit on application level (corresponding to layer 7 in the OSI layer model). The APDU is for example differentiated between command APDUs, which transmit commands to the chip card, and response APDUs, which also transmit the card's response to the command. Said communication happens via Answer to Reset and optional Protocol Type Selection after the communication has been established. The structures of command APDU and response APDU are defined in ISO standard 7816-4. Correspondingly, it is advantageous when the locking supports the following two operating modes:

(a) During programming the locking behaves like a passive card which is read out via APDU commands and is recorded with programming protocols.

(b) In order to read out key data, the locking behaves like a reader which reads key data sets from an identification medium via APDU commands (iCarte, key card).

According to the invention, the following behaviour of the locking is preferred (which may possibly be amended afterwards for existing locks, for example by changing the firmware): After wake up, the locking searches for a field arriving from a reader. If a field is found, the locking switches into the card emulation mode and may, via external commands, be correspondingly read out and programmed with programming protocols. If no field is found, the locking tries to actively read, as reader, a key (key data) from an identification medium (key card, iCarte adapter etc.).

The method according to the invention enables an easy, safe and efficient configuration of a locking system which comprises at least one electronic locking and at least one identification medium for operating the locking. Preferably, a locking system according to the invention comprises a plurality of lockings and a plurality of identification media wherein a configuration, on the one hand, serves for the inventory of the lockings and the identification media, i.e. it is determined which lockings and which identification media are part of the locking system. Furthermore, the configuration of the locking system serves the purpose of allocating access authorizations, i.e., it is determined which identification medium controls the opening of which lockings. The configuration preferably comprises the following steps. At first, a smartphone with a software (admin-app) for configuration should be provided, wherein the smartphone may communicate with the lockings and the identification media via radiocommunication. This enables the unambiguous identification of the lockings and the identification media on the one hand and the programming of the lockings and identification media on the other hand. According to the invention, identification and programming of the lockings and identification media is carried out by a simple "tapping". Subsequently, i.e. for already identified lockings and identification media, an allocation of access authorisations regarding the identification media to the lockings may be carried out by using the admin-app on the smartphone. Said allocation of access authorisations is preferably carried out via a locking-identification matrix which is visualized on the display of the smartphone. At first, said access authorisations and their allocation are stored locally on the smartphone. Subsequently, the data which are necessary for administration of the locking system are transmitted to the cloud. Said data preferably contain the allocation of the access authorisations, data regarding the lockings of the locking system and/or data regarding the identification media of the locking system, possibly also user data. Based on said data, a new dataset is generated in the cloud, which preferably comprises encoded programming data or uncoded programming data serving for programming the lockings. Furthermore, said newly generated dataset preferably contains key data which may be stored on identification media and serve for the operation of the lockings. Said newly generated dataset preferably contains encoded or uncoded programming data and/or encoded or uncoded key data which are transmitted from the cloud to the smartphone. This enables the smartphone to transmit the key data to identification media and/or to transmit the programming data to the lockings so that the identification media may now be used for operating the lockings according to the defined allocation. According to the invention, a locking may for example be a device from the group of: electronic locking cylinder, electronic lock and electronic fitting. According to the invention, an identification medium may for example be a device from the group of: RFID card, key card, smartphone with RFID functionality and transponder. RFID functionality of a smartphone may for example be achieved by means of an adapter. Thus, it is possible to configure the locking system via a smartphone which contains the admin-app. If additionally or alternatively the "mobile key app" is installed on the smartphone, it is possible to receive or download the (encoded) key data and subsequently open the lockings of the locking system for which the access authorisations are set.

According to the invention, the allocation of access authorisations from identification media to corresponding lockings may be carried out preferably very easily via a locking-identification media-matrix which is shown on the display of the smartphone.

The cloud comprises at least two services, one dataset service and one cloud-LSM-service. The smartphone preferably communicates with the cloud-LSM-service, wherein said cloud-LSM-service preferably communicates with the dataset service. The dataset service preferably serves for generating key data and/or programming data which are preferably part of a dataset being generated by the dataset service. In particular, also user data on the basis of the allocations are stored and/or generated on the cloud-LSM-service.

In order to transmit the key data generated in the cloud to smartphones, the cloud may comprise a mobile key server. Said mobile key server is preferably realized as an Over-TheAir mobile key server so that the key data may be sent wirelessly via the mobile network to a smartphone having the corresponding software (mobile key app).

The method according to the invention makes it possible to configure already inventoried existing locking systems and also to add further lockings and/or identification media to the locking system by means of inventory. Further, according to the invention, it is also possible, to newly configure a new locking system from the beginning. For this, it is necessary to firstly inventory the lockings and/or identification media.

In the following, a configuration process of the locking system is shortly described. The user/administrator orders and gets: i) locking cylinder with RFID/NFC interface; j) Mifare Classic cards (empty) or MiFare DESFire (preformatted); adapter attachments/micro SDs for Mifare Classic/DESFire emulation. The user starts the admin-app on the smartphone and allocates a password for the locking system which is to be newly generated. Subsequently, the user taps locking cylinders and allocates names to these lockings. Subsequently, the user taps the cards/iCartes and allocates user names. Thus, a matrix is generated in which the user subsequently allocates authorisations. When tipping on "Save to Cloud", the locking data which have been generated just now are sent to the "cloud" or to the "SOHO-cloud-service" via https. Locking data may for example comprise the locking system password, unambiguous hardware identifier of the lockings together with the names allocated by the user, unique IDs of the cards/adapters together with the user names allocated by the user, locking authorisations who locks where, possibly additional limitations.

A subsequent service then generates programming protocols for all devices concerned (lockings, cards, adapters/iCartes) and sends them back to the user's smartphone. There they are at first temporarily stored (at a place without special safety requirements). When the user then subsequently taps the separate devices for a second time in any arbitrary order, the programming protocols provided for the corresponding device are started. Said process may be so fast that tapping once (from the user's point of view) is also sufficient. Here, the device data are recorded and, together with the locking data, sent to the SOHO-cloud-server, processed there and resulting programming protocols are sent back to the smartphone and immediately installed on the corresponding device (locking/card/iCarte adapter).

The communication with the cloud servers is preferably secured via https. The admin phone is preferably safe. It is operated by the person who already controls the locking system. Programming datasets are digitally signed by the SOHO Cloud Service and the signature is verified by the corresponding locking so that no manipulation is possible on the way between server and locking. In addition: The communication between dataset service via mobile key server to the adapters is preferably end-to-end encoded (adapters (iCartes)/micro SDs are once initialized by the admin with a key-data-key, and may subsequently communicate with the OTA server without assistance of the admin).

SHORT DESCRIPTION OF THE FIGURES

In the following, preferred embodiments of the present invention are described, thereby referring to the Figures:

FIGS. 3, 4 and 5 show a preferred design of a locking-identification-media-matrix as it is shown on a display of a smartphone;

DETAILED DESCRIPTION OF PREFERRED EMBODIMENTS

Figure 1:
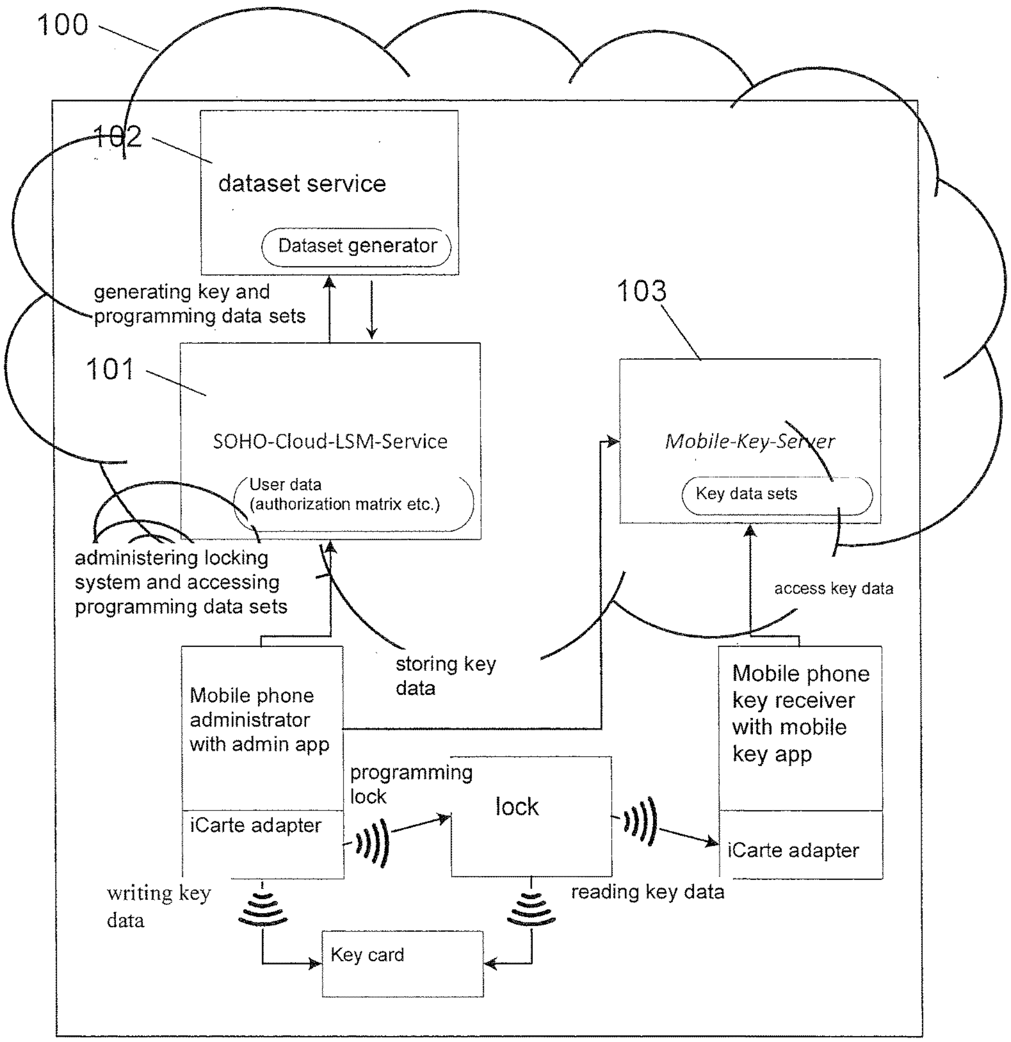
FIG. 1 shows a schematic overview of the basic structures of the locking system according to the invention.

FIG. 1 shows as first embodiment according to the invention a schematic overview of the basic structures of a system according to the invention. One advantage of the invention is that the locking system—which preferably comprises a plurality of electronic lockings—may be installed and/or administrated preferably by using an admin-app 1, which may preferably be executed on a smartphone, a tablet computer and/or a computer. In particular, the admin-app may be seen as a realization of a system component according to the invention, which is a user interface. The admin-app preferably provides at least one of the following functionalities:

Login or Registration

Preferably, at first an authentication of an administrator by the admin-app is preferred, in order to prevent manipulations. For example, an administrator may authenticate himself in a login window with input field for username and password (login-password), wherein the password may simultaneously be the password for the locking system. Alternatively, the login-password and the password for the locking system may be different passwords/code words. When registering for the first time, for example an input field for the generation of a user name plus password and repetition of the password appears. If a secure element is available on the smartphone, for example a secure element for NFC, on which the admin-app is executed, the password may be stored in the secure element so that for example a short PIN for authentication may be considered sufficient for subsequent logins.

Figure 2:
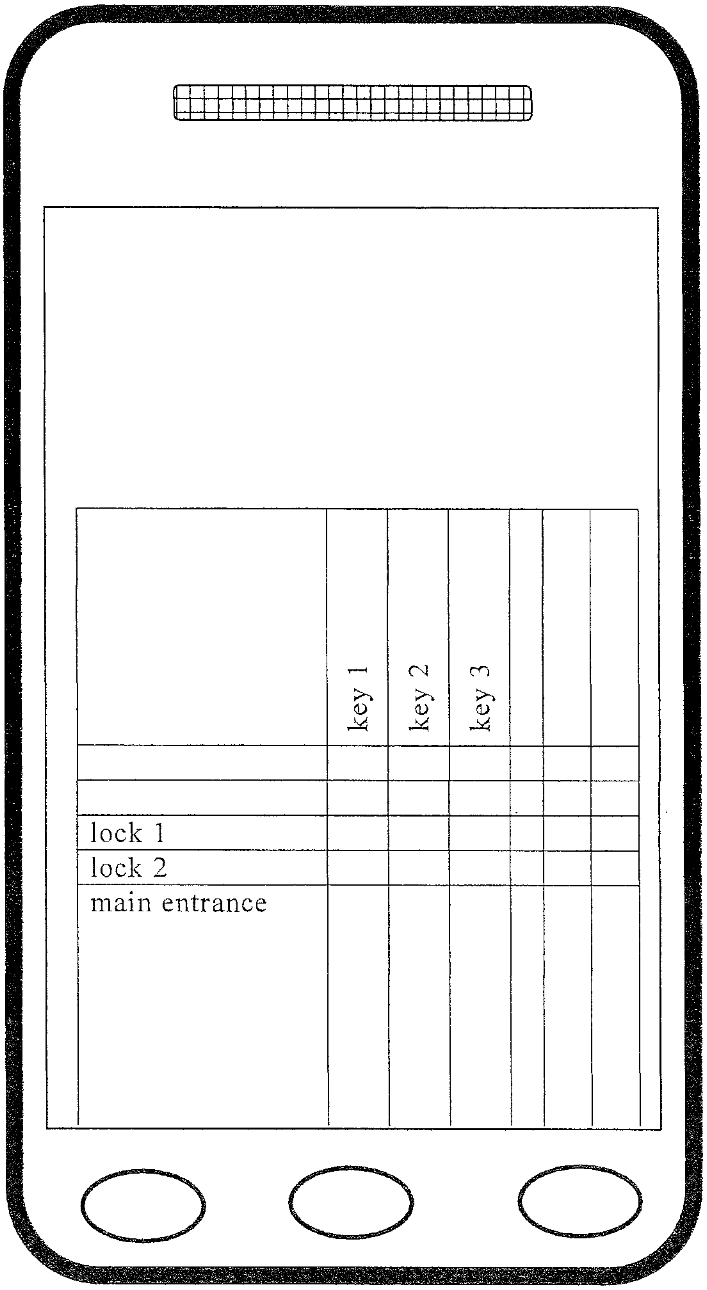
FIG. 2 shows a locking-identification-media-matrix as it is shown on a display of a smartphone.
Figure 3:
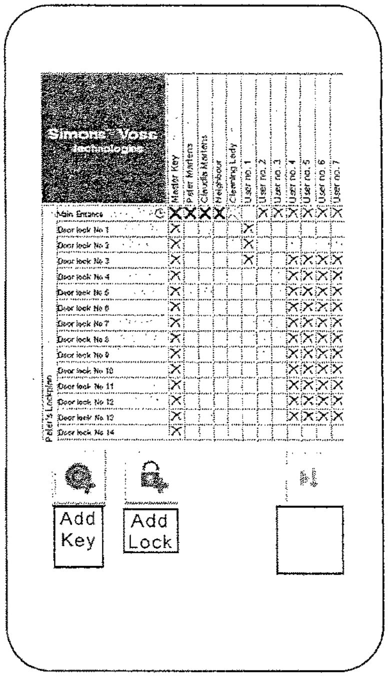

The user (administrator) who is thereby authenticated may now for example generate identification media (for example key card 11 in FIG. 1) or lockings (for example lock 10 in FIG. 10). In other words, the lockings of the locking system are firstly registered with the corresponding identification media. Furthermore, the administrator may determine which lockings may be opened by which identification media, i.e. access authorisations of the identification media may be allocated to the lockings, which are for example visualized in a lockings-identification-media-matrix. A lockings-identification-media-matrix in general is shown for example in FIG. 2 and more specific in FIG. 3. Preferably, the allocation of locking to identification medium is (at first) only intermediately stored locally on the smartphone.

If a “Save to Cloud” command (for example in the matrix window, see FIG. 3) is executed later, new “accounts” are generated corresponding to the allocations in the cloud, preferably on a SOHO-cloud-server 101.

The method according to the invention generates, after the generation of lockings, a “success” pop-up and generates subsequently the locking-identification-media-matrix and shows identification media but also inventoried lockings and identification media. After successful login on the admin-app, for example a lockings-identification-matrix opens on a display of the smartphone (see FIGS. 2 and 3). Here, additionally two symbols may be shown, “Add Lock” and “Add Key”. The lockings-identification-media-matrix may subsequently be changed by adding new lockings (Add Lock) or new identification media (Add Key).

According to a preferred embodiment it can/must be checked at the SOHO cloud server, after each successful login, whether there already exist locking system data for said account. If so, they are downloaded and visualized in the matrix. In this case, a successful download preferably is the requirement for subsequent working at the locking plan.

Figure 4:
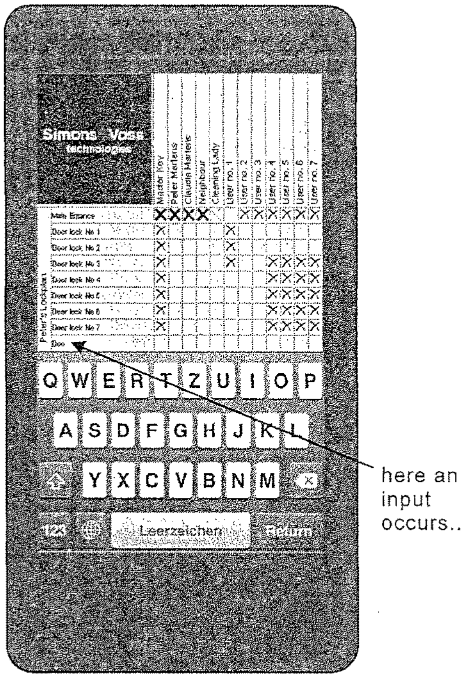

If it is tipped on one of the “Add” symbols (Add Key, Add Lock), an additional empty column or row is firstly generated and the lower half of the display shows a keyboard so that now a name can be allocated to the locking/identification medium to be added (see FIG. 4). The name should preferably be inserted at the right place in the matrix. Therefor, the matrix is automatically scrolled such that the name field to be recorded is visible. After the name has been inserted, one pushes “return” (or “ready”), the keyboard disappears and the view of FIG. 3 appears again. Preferably, the locking which has newly been generated is marked (for example in blue color) and the font is for example in italics (this is the note that the locking is not yet inventoried). Now, the user/administrator may choose whether he subsequently taps said marked locking with the smartphone or whether he tips again one of the “Add” symbols. If a locking is tapped, i.e., a wireless communication between the smartphone and the locking is generated, the locking is inventoried with name and UID/PHI and then preferably appears in normal font in the matrix, which symbolizes a finished process. If, however, it has not been tapped, the font remains in italics, which shows that the locking has not yet been inventoried. The inventory may be made up for preferably at any time, by marking the name of the locking to be inventoried via tipping on the smartphone (which for example causes a blue highlighting). Subsequently the respective locking has to be tapped, which causes an unambiguous allocation of the hardware identifier (UID of cards, PHI of lockings) to the name chosen by the admin. Said inventory of lockings may correspondingly be carried out for identification media, i.e., the method described in the section above may also be applied when the term locking is replaced by identification medium. Preferably, the process of generating and inventorying is repeated as often as necessary to register the complete locking system.

A locking system generated by the method above may be visualized easily on the display of the smartphone via the locking-identification-media-matrix according to the invention (see FIG. 5). For example, in FIG. 5 the following is shown: the locking system’s name (“Peter’s locking plan”); the lockings/locks (“Main Entrance”, Door lock no. 1, . . . ), the identification media (“master key”, Peter Martens, . . . ), the authorisation structure (see further below), markings (for example highlighting), programming requirement (lightning flash), possible time limits for identification media (clock symbol). Said matrix is preferably scrollable via “touch and drag”. If one scrolls for example to the right or to the left, the locking system’s names (in the example above “Peter’s locking plan”), as well as the names of the lockings remain at the same place whereas the names of the keys (identification media) follow the movement of the matrix window. If one scrolls for example upwards or downwards, the names of the locks correspondingly follow the movement of the matrix window, whereas the name of the locking system and the names of the keys remain at the same place. Preferably, the matrix may be drawn up such that the input fields may be enlarged such that authorisation crosses may be set or removed comfortably via tipping with the finger.

The allocation of authorisation accesses is preferably carried out via tipping the authorisation fields in the matrix. The removal of the access authorisations is preferably carried out via a second tipping. This usually generates a programming requirement which is visualized after a “save to cloud” (see FIG. 3) and automatic download of the programming data (see further below) with programming requirement flashes. The programming requirement is preferably shown with regard to the respective lockings as well as with regard to the respective identification media.

The matrix according to the invention also enables a clear visualization of programming target and actual states. Preferably, four possibilities exist regarding the authorisation state, which may be visualized as follows: (i) no cross is shown, identification medium is not supposed to be authorized and is not authorized either (no programming requirement); (ii) cross is shown in italics or thin, identification medium is supposed to be authorized regarding corresponding locking, however, is not yet authorized (programming requirement); (iii) cross is shown bold, identification medium is supposed to be authorized and is also authorized (no programming requirement); (iv) cross is shown inversely, identification medium is not supposed to be authorized, but is still authorized (programming requirement).

One further advantage of the locking system according to the invention is the allocation of device-specific properties, i.e. the allocation of specific properties for individual locking(s) and/or individual identification medium/media. The allocation of device-specific properties is carried out for example after tipping the devices (lockings or identification media) in the matrix twice (alternatively: long tipping). After tipping the name of a device for the first time, said device is for example deposited (in the state which is achieved after tipping once, a device which is not yet inventoried might be inventoried by tapping on, see further above). If the name of the marked device is tipped on for a second time, preferably the following specific properties may be allocated.

A pop-up window with editable input fields can be opened for a locking, in said pop-up window the name of the locking and/or the indication how long the locking should remain open after opening, may be inserted. In case the locking is already inventoried and a "save to cloud" was already carried out, additionally for example a question mark symbol appears which opens, after clicking on it, a transparent information field with locking data.

For an identification medium similar pop-up windows may be edited, i.e., for example the name of the locking ("name of key") and/or time periods when the identification medium may access the locking ("Key shall be valid from", "Key shall expire"). If the identification medium is already completely inventoried and the system has recognized a smartphone, further input fields may appear, which determine how long the identification medium is valid after a download ("Key shall be valid for hours after download of key data").

Storing locking system data in the cloud and transmitting key datasets for smartphones received from the cloud to the OTA key server is preferably carried out after tipping the button "Save to Cloud" in the matrix basic view. After tipping "Save to Cloud" in the matrix basic view, for example a pop-up window appears which shows the process progress with progress bar. During said process, for example web-service-based functionalities of all locking system data generated by the admin may be deposited in the SV locking system database of the SOHO cloud server. Said functionalities form the so-called SIK (software integration kit) interface for already administered locking system data. Vice versa, after successful login of the admin, all data may be downloaded from the cloud for a visualization in the matrix. Additionally, a service preferably is available which can detect all programming requirements.

After successful upload of the locking system data ("Save to Cloud"), a central service (dataset service 102) detects or calculates programming datasets for all lockings and identification media, said programming data sets then being sent back to the admin's smartphone and stored there. For example, also key data (data for the identification media) for smartphones may be sent to the OTA-key-server 103, where they may be accessed at any time from the mobile key users (mobile key app). In FIG. 1 this is shown for example by the arrow "depositing key data". Alternatively or additionally, the key data may also be sent from the SOHO-cloud-LSM-service 101 directly back to the OTA key server 103 (not explicitly shown in FIG. 1).

The SOHO-Cloud-LSM-service is a central service of the system according to the invention. Said service allows depositing and administrating user data and user profiles (admin access data, authorisation matrix etc.) of the SOHO users on a central database server. One may comfortably administrate a SOHO locking system via different devices due to the central storage of the data "in the cloud". Data which are relevant for safety as for example the locking system password, are, however, not stored in the cloud. The SOHO-Cloud-LSM-service is accessed via the admin-app and communicates with the dataset service.

The invention also comprises the exact expressions, features, numeric values or ranges etc, if said expressions, features, numeric values or ranges are mentioned before or after in the context with terms like for example "approximately, about, substantially, generally, at least" etc (i.e. "approximately 3" also comprises "3" or "substantially radial" also comprises "radial").

The invention claimed is:

1. A method for the configuration and administration of a locking system comprising at least one electronic locking and at least one identification medium for operating the locking, wherein the method comprises the following steps:

a) providing a smartphone with an administration software for the administration and configuration of the at least one locking and the at least one identification medium wherein the smartphone may communicate with the locking and the identification medium via a wireless communication link;

b) allocating access rights of the identification medium to the locking via the administration software of the smartphone and locally storing said allocation of access rights in the smartphone, wherein the allocation of access rights from identification media to corresponding lockings may be visualized and configured by means of a locking-identification-media-matrix on the display of the smartphone;

c) reading out the identification data which are specific for the locking/identification medium and transmitting said data as well as the access rights from step b) to a cloud, d) generating programming data, preferably encoded programming data, and/or key data in the cloud by means of a server in the cloud on the basis of said transmitted allocations;

e) receiving the programming data or the encoded programming data and/or key data from the cloud using the smartphone; and f) transmitting the key data from the smartphone to the at least one identification medium and/or transmitting the programming data from the smartphone to the locking.

2. The method according to claim 1, wherein the locking system comprises a plurality of electronic lockings and a plurality of identification media.

3. The method according to claim 1, wherein i) a locking may be a device from the group of: electronic locking cylinder, electronic lock and electronic fitting; and/or ii) an identification medium may be a device from the group of: RFID card, key card, smartphone with RFID functionality and transponder.

4. The method according to claim 1, wherein the smartphone communicates with the locking and/or the identification medium by means of an adapter.

5. The method according to claim 1, wherein the cloud provides a dataset service and a cloud-LSM-service wherein the smartphone communicates with the cloud-LSM-service and the cloud-LSM-service communicates with the dataset service, wherein the key data and programming data preferably form part of a dataset which is generated by the dataset service.

6. The method according to claim 5, wherein the mobile key server is an OverTheAir mobile key server and the key data are sent wirelessly, preferably via the mobile communications network to a smartphone having a corresponding software (mobile key app).

7. The method according to claim 1, wherein user data are stored or generated on the basis of the allocations by means of the cloud-LSM-service.

8. The method according to claim 1, wherein the cloud additionally comprises a mobile key server for storing and distributing the key data, wherein the key data are used by an identification medium for opening a locking, and the mobile key server transmits the key data to a smartphone with a corresponding software (mobile key app).

9. The method according to claim 1, wherein between step a) and b) the step a1) for inventorying the at least one locking and/or the at least one identification medium is carried out, in which the at least one locking and/or the at least one identification medium is recorded and unambiguously identified and in step c) data regarding the recorded lockings and/or identification media are additionally transmitted to the cloud.

* * * * *